Sept. 1, 1925.

J. A. ANDERSON

SEISMOMETER

Filed April 12, 1924

Inventor
John A. Anderson
by his Attorneys
Baldwin & Wight

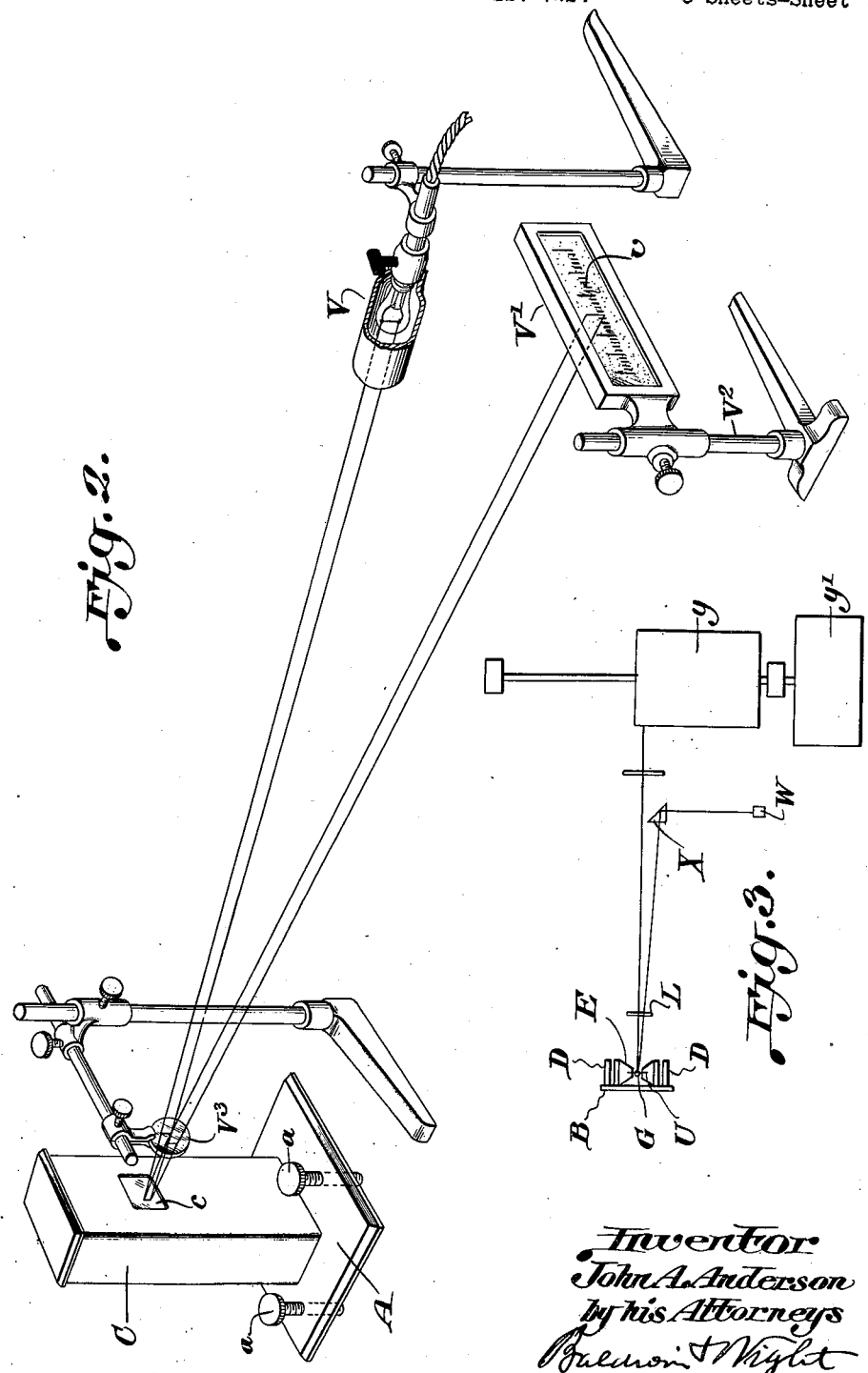

Sept. 1, 1925.
J. A. ANDERSON
1,552,186
SEISMOMETER
Filed April 12, 1924  3 Sheets-Sheet 3
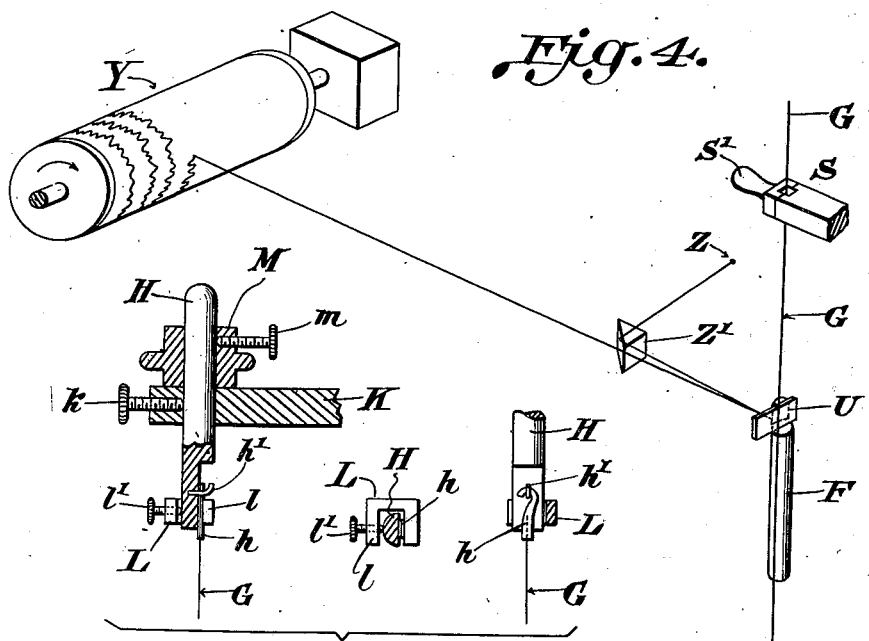
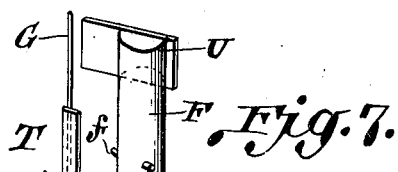
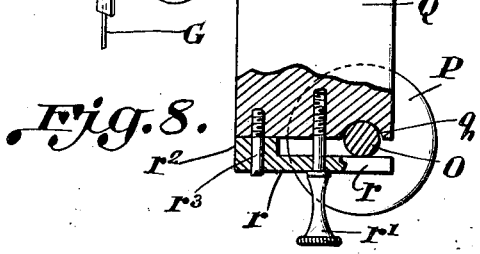
Inventor
John A. Anderson
by his Attorneys
Baldwin & Wight Patented Sept. 1, 1925.

1,552,186

UNITED STATES PATENT OFFICE.

JOHN A. ANDERSON, OF PASADENA, CALIFORNIA, ASSIGNOR TO CARNEGIE INSTITUTION OF WASHINGTON, OF WASHINGTON, DISTRICT OF COLUMBIA.

SEISMOMETER.

Application filed April 12, 1924. Serial No. 706,212.

*To all whom it may concern:*

Be it known that I, JOHN A. ANDERSON, a citizen of the United States, residing at Pasadena, in the county of Los Angeles and State of California, have invented certain new and useful Improvements in Seismometers, of which the following is a specification.

This invention relates to instruments employed to indicate the character, extent, frequency, and duration of vibrations of the earth and also of various other bodies, structures, and objects to which vibrations are incident. Various instruments for these purposes have heretofore been used, but by my invention the construction of the instrument is simplified as compared with some and made more sensitive and reliable as compared with others.

In such instruments a relatively heavy mass of solid material, forming a portion of the instrument, has been supported in such a way as to allow more or less unimpeded movement of the mass in at least one direction with respect to the rest of the instrument. Owing to its inertia, the mass tends to remain at rest, or if in motion, to continue its motion without change of direction or velocity. If the portion of the instrument which supports this mass is caused to move or to change its motion, a displacement will, in general, occur in the relative position of the mass with respect to the rest of the instrument, the magnitude or acceleration of which may be measured or recorded.

In the instrument made according to my invention a mass of suitable dimensions and material is supported on a thin fiber or filament held under tension and offering only a small, elastic resistance to rotation of the mass around the fiber. If the instrument as a whole is caused to move or to change its motion in such a way that there is a component of this motion or change of motion in a direction at right angles to the plane containing the fiber and the center of gyration of the mass, the mass will rotate with respect to the rest of the instrument. The suspended mass is associated with a mirror or reflector on to which a beam of light is projected and this beam of light is in turn reflected to an observation device which is conveniently in the form of a plate of ground glass so supported as to receive the reflected, vibrating beam and to display to the observer the record transmitted by the beam to the glass. A suitable lens may be so located in the path of the light as to produce on the glass a clear image of the source of light which may preferably be a heated lamp filament. The glass may be replaced by a recording instrument involving the use of photographic sensitized paper moved across the path of the light beam in such manner as to receive a record of the vibrations and this record may be made permanent by developing the paper in well known ways. Other features of the instrument will be hereinafter described.

My invention may be embodied in instruments varying in details of construction. The instruments shown in the accompanying drawings indicate the best way now known to me of accomplishing the desired results.

Figure 2 is a diagram showing the receiving and transmitting instrument, the lens associated therewith for directing the light beam upon the mirror of the instrument, the source of light which projects a beam of light to the mirror, and a receiver of the reflected beam where the vibrations may be observed.

Figure 3 is a diagram indicating how the receiving or observation device shown in Figure 2 may be replaced by a recording outfit.

Figure 4 shows diagrammatically how a permanent record may be made and this diagram also indicates how the mass and mirror are associated with the tensioned filament and how transverse vibrations are damped out of the filament by lubricated bearings.

Figure 1:
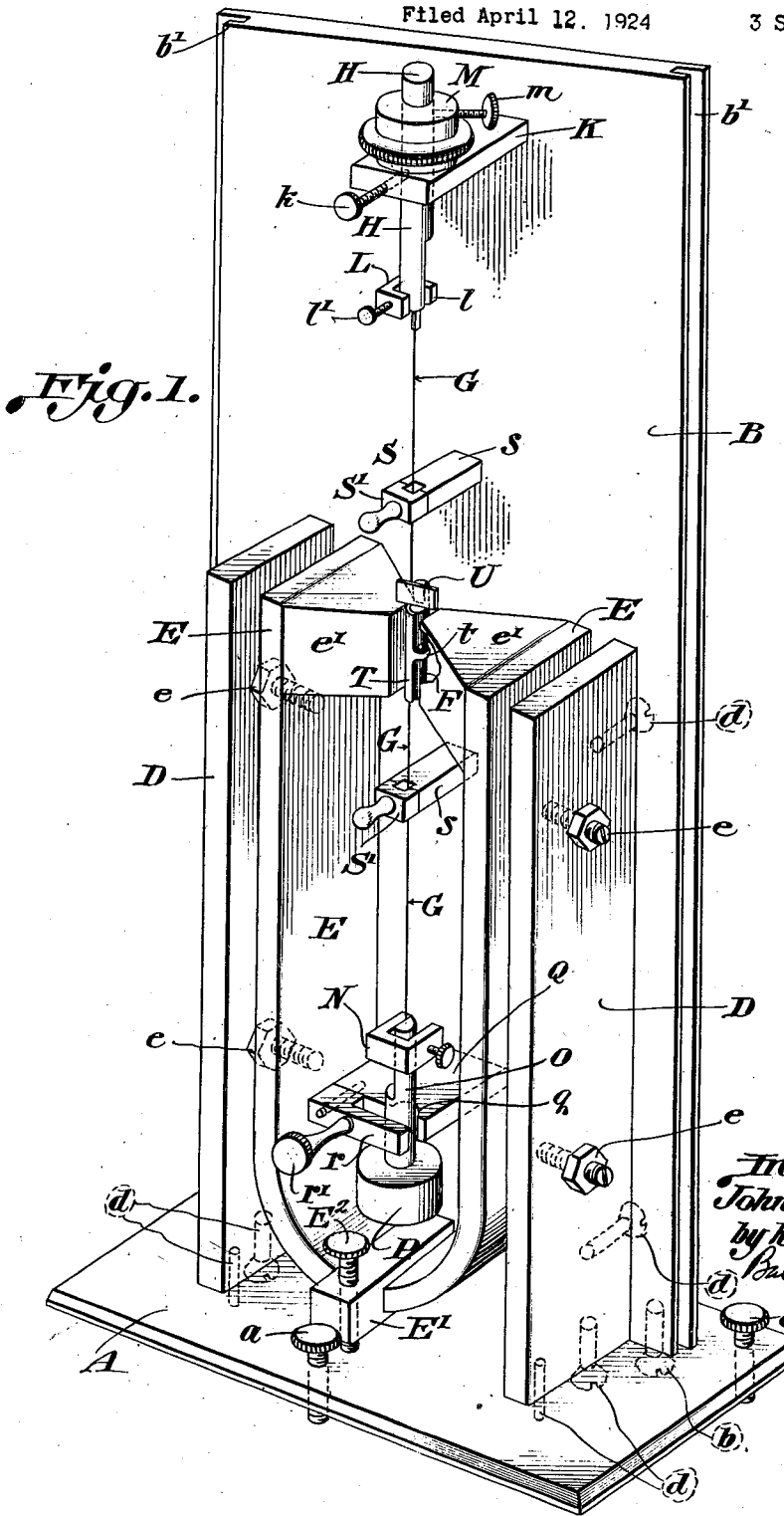
Figure 1 is a perspective view of the instrument which receives and transmits the vibrations being observed, a portion of the instrument casing being removed.

Figure 5 includes fragmentary detail views showing devices for supporting and adjusting the filament at its upper end.

Figure 6 is a detail view of one of the lubricated bearings, or damping devices.

Figure 7 illustrates how the mass may be attached to the filament.

Figure 8 shows the devices preferably employed for attaching the tension weight to its support.

Figure 9 is a diagram illustrating the relative movements of the filament, the mass, and the mirror due to horizontal vibrations.

One form of instrument for receiving and transmitting the vibrations being observed is illustrated quite clearly in Figure 1. It comprises a base A provided with leveling screws $a$ and a vertical frame piece B attached to the base by screws $b$ or in any other suitable ways. The vertical frame piece B is mortised as indicated at $b'$ to receive the case C shown in Figure 2. Vertical frame pieces D are attached to the base and to the vertical frame piece B by shiftable devices $d$. The drawings show a permanent horse shoe magnet E interposed between the frame members D and held in place by screws and nuts $e$. An arm E', extending laterally from the lower end of the magnet, carries an adjusting screw $E^2$. By means of the devices $e$ and $E^2$ the position of the magnet may be changed or adjusted as circumstances require. The function of the magnet will be hereinafter explained.

A mass of suitable material F is suspended on a thread, fibre, or filament G preferably in a magnetic field between the pole pieces $e'$ of the magnet, and this filament is held under tension in a more or less vertical plane by devices of suitable construction engaging its upper and lower ends. Preferably these devices are of the kind indicated in Figure 1 and shown more in detail in Figures 5 and 6.

The upper end of the filament is held between hook shaped members $h$ which engage an arm $h'$ projecting horizontally from a short rod H which extends through a bracket K projecting forwardly from the frame member B. The hooks $h$ are held firmly in place on the rod by a clamp L comprising a yoke $l$ and a set screw $l'$. The lower end of the filament is held in a similar way as will be presently described. That portion of the rod H which extends above the bracket K carries a head M fastened to the rod by a set screw $m$ and the bracket K is equipped with a set screw $k$ by means of which the rod H may be fastened to the bracket.

The lower end of the filament is connected by devices, similar to those before described, to the upper end of a short rod or stem O and these devices are held firmly in place by a clamp N similar to the clamp L before described. The rod O carries a weight P and extends through a groove $q$ in the front portion of a bracket Q and it is held in the groove by a clamping device comprising an arm $r$ extending laterally from a thickened portion $r^2$ and a set screw $r'$. A screw $r^3$ is employed to attach the arm to the bracket.

When the screw $r'$ is tightened, the rod O is rigidly held in the bracket Q and the weight P is not supported by the filament, but when the screw $r'$ is loosened, the weight imparts strain to the filament. The filament G extends through but does not touch lubricated bearings S located above and below the mass F. These bearings may be varied in construction, as shown each such bearing comprising an arm $s$ extending outwardly from the frame member B and formed at its front end with a recess $s'$ and with pin holes $s^2$. A cap S' carrying pins $s^3$ and adapted to fit the holes $s^2$ of the arm is formed with a recess $s^4$ registering with the recess $s'$. A drop of lubricating viscous material, such as castor oil, which will adhere in the recess and not drop through it, is placed in the recess through which the filament extends. Lubricated bearings similar in all respects to those just described are placed in the instrument both above and below the mass F which latter may be attached to the filament G by any suitable devices, that shown consisting of a thin metal strip T secured to the filament by solder and having arms $t$ which extend part way around the mass below pins $f$ extending laterally therefrom. The lubricated bearings S constitute damping devices for horizontal vibrations of the filament without affecting torsional movements thereof.

A reflector or mirror carried by the mass F is indicated at U. This may be made of any suitable material but should be of light weight.

The receiving and transmitting instrument is associated with a source of light V, suitably supported at the required distance from it, and with an observation member V' also suitably located and preferably consisting of a plate of ground glass $v$ held in a suitable frame $v'$ vertically adjustable on a support $v^2$.

A lens $v^3$ is set a suitable distance from the opening $c$ of the instrument casing through which the beam of light from the lamp V is projected to the mirror U and through which the beam is passed from the mirror to the observation device V'.

The mass F is preferably cylindrical and preferably of copper. It is located in a magnetic field in such manner that its oscillations may be properly damped.

In setting up the instrument the base is first leveled by means of the screws $a$ and the screw $r'$ is loosened so that the weight P hangs free and exerts a downward pull or tension on the filament G. The set screw $k$ at the top of the instrument is tightened and the screw $m$ loosened. The head M is then moved upwards on the rod H and the screw $m$ is again tightened. While the head is held by the fingers of the operator, the screw $k$ is loosened and the rod H is moved up or down or turned to the required extent to properly position the mass F in the magnetic field with the mirror U above the poles of the magnet. Then the set screw $k$ is tightened and the set screw $m$ loosened, allowing the head M to drop to the supporting bracket K. Then the screw $m$ is tightened and the screw $k$ is loosened. The screw $r$ may then be tightened so as to hold the weight P firmly in the bracket Q. In this way the filament is given the desired torsion and tension and is held rigidly at its upper and lower ends. The instrument may now be more precisely leveled by means of the screws $a$ and the direction of the mirror adjusted by turning the head M. When these adjustments are made and the lens $V^3$, source of light V, and observation device V' are properly located and adjusted the apparatus is ready for use.

Horizontal vibrations of the earth, building, or other object being observed are transferred to the base A and then to the filament G, mass F, and mirror U, and the vibration of the mirror imparts a vibratory movement to the beam of light observed on the member V'. A recording device of any approved kind may be employed in place of the member V' or associated with it.

In Figure 3 I have indicated a suitable outfit for recording. The mirror of the instrument is shown at U, a source of light at W, and a lens or mirror at X. The beam of light reflected from U passes through the lens L, thence to the photographic paper or a sensitized film arranged on a cylinder $y$ which may be revolved by a motor $y'$ and at the same time moved endwise. This form of recorder is old in the art and need not be further described. When recording in this way, the beam should be focused to a point on the record cylinder. Instead of using an optical system and photographic paper, a mechanical system and smoked paper or other suitable substitute may be used. In Figure 4 the recording apparatus is indicated at Y, the light at Z, and the prism at Z'.

Figure 9 indicates diagrammatically the movements of the filament G, the mass F, and the mirror U. Vibrations of the object being observed having a component in the direction of the arrows 1 will cause the filament to move back and forth while the mass lags, thus causing the filament to twist or be put under torsional strain or to untwist or reduce the torsion to which it has been adjusted or changed, or the mass will swing about the filament in the manner indicated by dotted lines. The mirror is correspondingly oscillated and thus a beam of light is vibrated. When the instrument is set to observe a given horizontal component of vibration, the component at right angles to that first mentioned will not be indicated. In order to observe all horizontal vibrations, two components are necessary and two instruments should be used, being placed preferably so that the plane containing the filament and center of gyration of the mass in one instrument is at right angles to the similar plane in the other instrument. Vertical vibrations may be observed by a suitable modification of the instrument and associated apparatus.

Figure 9 also illustrates by the arrows 2 the movements of the parts when vibrations in a direction at right angles to those indicated by the numerals 1 are being observed.

The component of any movement of the frame of the instrument which is in a direction perpendicular to the plane containing the filament and the center of gyration of the mass (which is not in the axis of the mass by filament) is transmitted to the mass by means of the supporting filament and causes the mass to oscillate, thus reflecting and vibrating the beam of light received by the mirror. Prolonged or undue oscillations of the mass are prevented by placing the mass in a magnetic field as before described.

The record of the vibrations is of the same sort as the records furnished by existing seismometers.

The fibre or filament hereinbefore referred to is preferably made of tungsten, silica glass, or other suitable material possessing the same characteristics and performing the same functions.

The elements of the instrument are so associated that the mass and mirror constitute an eccentric mass, having its position of equilibrium determined by a restoring force due wholly to the torsion of the filament. When disturbed by horizontal earth-motion or the motion of other objects being observed, rotation of the eccentric system takes place about the filament as an axis. A horizontal vibration, like that of a violin string, of relatively very short period results from a sufficiently strong acceleration. In order to prevent such horizontal vibration or damp it out very rapidly the damping bearings before referred to are employed. These damping devices exert almost no damping on the torsional vibrations of the system which are set up by a horizontal earth motion. To realize the conditions of critical damping for torsional vibrations the magnet hereinbefore mentioned is employed and it is so placed that the mass F is suspended in the air-gap between the pole pieces of the magnet, so that the small oscillations of the mass about its equilibrium position take place at right angles to the magnetic field. The magnet may be adjusted vertically by means of the screw $E^2$. With the magnet in its lowermost position, the mass is entirely out of the magnetic field. In this position, since the damping is nearly zero, the undamped free period of the filament may be determined. With the magnet raised to its highest position the entire mass is in the magnetic field and the system is then somewhat overdamped and further adjustments should be made. Thus by merely moving the magnet vertically all conditions between nearly zero damping and aperiodicity may be realized.

The manner in which the instrument is adjusted has been briefly hereinbefore described. More specifically it may be stated as follows.

The adjustment of the instrument involves the untwisting of the torsion filament and placing it in a vertical position in such a way that the line drawn from the point of support through the center of the mass shall be parallel to the magnetic field in the air-gap or what is nearly sufficient, until the normal to the mirror is at right angles to the field. With the holding devices at the upper end of the filament clamped, the clamp screw $r'$ at the lower end is loosened and the instrument is levelled until the arm O hangs freely. The filament then untwists slowly on account of the large inertia of the weight P and will finally come to rest in a definite position. Suppose that in this position the angle between the normal to the mirror and the magnetic field in the air-gap is not a right angle, it can be made so by loosening the proper set screw of the holding devices at the upper end of the filament and rotating the whole system the required amount. After this is done the holding devices at both the upper and lower ends of the filament should be clamped. Adjustments should be made to place the filament in the vertical again for the operations of clamping will nearly always leave it inclined more or less. Proper adjustment should be given to the instrument by the leveling screws $a$ and then the magnet is adjusted until the damping has the required value.

The "filament" may be in the form of a fine thread of circular cross section or in the form of a thin ribbon. Where in the specification or claims I refer to a filament or a fibre I wish it understood that I consider within the scope of my invention similar forms of mass supporting devices.

I claim as my invention:

1. A seismometer comprising a filament, means for placing it under tension lengthwise, a mass supported by the filament having substantial inertia and whose center of gravity is eccentric to the filament, and means controlled by the mass for causing indications of vibrations transmitted to the instrument.

2. A seismometer comprising a vertically arranged filament, means for turning it and placing it under torsional strain, means for placing the filament under tension lengthwise, a mass supported by the filament having substantial inertia and whose center of gravity is eccentric to the filament, and means controlled by the mass for causing indications of vibrations transmitted to the instrument.

3. A seismometer comprising a filament, means for placing it under tension lengthwise, a mass supported by the filament having substantial inertia and whose center of gravity is eccentric to the filament, and means associated with the mass for receiving and reflecting a beam of light.

4. A seismometer comprising a filament, a mass supported eccentrically by the filament, means associated with the mass for receiving and reflecting a beam of light, devices at one end of the filament for adjusting its position, a weight connected with the opposite end of the filament, and means for rigidly supporting the weight.

5. A seismometer comprising a filament, means for placing it under tension lengthwise, a mass supported eccentrically by the filament, means associated with the mass for receiving and reflecting a beam of light, a magnet in the magnetic field of which the mass is located and means for adjusting the filament lengthwise to change the position of the mass in the magnetic field.

6. A seismometer comprising a filament, means for producing a magnetic field, a mass supported eccentrically by the filament in said magnetic field, devices at the upper end of the filament for adjusting the filament lengthwise, a weight supported by the lower portion of the filament and means for rigidly connecting the weight with the frame of the instrument when the proper adjustment has been made.

7. A seismometer comprising a filament, means for placing it under tension lengthwise, a mass supported eccentrically by the filament, means associated with the mass for receiving and reflecting a beam of light and a lubricated bearing through which the filament extends and which provides a damping means for filament.

8. A seismometer comprising a filament, means for placing it under tension lengthwise, a mass supported eccentrically by the filament, means associated with the mass for receiving and reflecting a beam of light, a magnet in the magnetic field of which the mass is located, and means for adjusting the position of the magnet.

9. A seismometer comprising a filament, means for placing it under tension, a mass supported eccentrically by the filament, means associated with the mass for receiving and reflecting a beam of light, means for adjusting the filament lengthwise, and lubricated bearings through which the filament extends and which afford damping means for the filament.

10. A seismometer comprising a filament, a mass supported eccentrically by the filament, means for adjusting the tension of the filament lengthwise and rotatively and bearings containing viscous material through which the filament extends and which damp lateral vibrations of the filament without affecting torsional movement thereof.

11. A seismometer comprising a tungsten filament, a copper cylinder supported eccentrically by the filament, means for adjusting the tension of the filament lengthwise and rotatively, bearings above and below the cylinder containing a viscous substance through which the filament extends and which damp lateral vibrations of the filament without affecting torsional movement thereof, a magnet in the field of which the cylinder is supported by the filament, and means for adjusting the position of the magnet relative to the cylinder.

In testimony whereof, I have hereunto subscribed my name.

JOHN A. ANDERSON.